United States Patent
Baek et al.

(10) Patent No.: US 11,310,630 B2
(45) Date of Patent: Apr. 19, 2022

(54) POSITION TRACKING DEVICE AND METHOD FOR PROVIDING LOW POWER GEOFENCE SERVICE

(71) Applicant: AMOTECH CO., LTD., Incheon (KR)

(72) Inventors: Hyungil Baek, Yongin-si (KR); Hoeyoung Hwang, Gunpo-si (KR); Kyunghyun Ryu, Seoul (KR); Semin Oh, Incheon (KR)

(73) Assignee: AmoTech Co., Ltd., Incheon (KR)

( * ) Notice: Subject to any disclaimer, the term of this patent is extended or adjusted under 35 U.S.C. 154(b) by 49 days.

(21) Appl. No.: 16/958,697

(22) PCT Filed: May 29, 2019

(86) PCT No.: PCT/KR2019/006426
§ 371 (c)(1),
(2) Date: Jun. 27, 2020

(87) PCT Pub. No.: WO2019/231233
PCT Pub. Date: Dec. 5, 2019

(65) Prior Publication Data
US 2021/0014645 A1    Jan. 14, 2021

(30) Foreign Application Priority Data

| May 30, 2018 | (KR) | .......................... 10-2018-0062010 |
| Jun. 20, 2018 | (KR) | .......................... 10-2018-0070869 |
| May 28, 2019 | (KR) | .......................... 10-2019-0062322 |

(51) Int. Cl.
*H04W 4/029* (2018.01)
*H04W 4/38* (2018.01)
(Continued)

(52) U.S. Cl.
CPC .............. *H04W 4/029* (2018.02); *G16Y 20/10* (2020.01); *G16Y 40/60* (2020.01); *H04W 4/021* (2013.01);
(Continued)

(58) Field of Classification Search
None
See application file for complete search history.

(56) References Cited

U.S. PATENT DOCUMENTS

| 7,616,153 | B2 | 11/2009 | Honda et al. |
| 10,043,527 | B1 * | 8/2018 | Gurijala ................ G10L 19/018 |

(Continued)

FOREIGN PATENT DOCUMENTS

| CA | 2683813 A1 * | 11/2008 | ............ G01S 5/0027 |
| CA | 3095334 A1 * | 10/2019 | ............... G07C 9/27 |

(Continued)

OTHER PUBLICATIONS

International Search Report dated Sep. 16, 2019 in International Patent Application No. PCT/KR2019/006426.
(Continued)

*Primary Examiner* — Fekadeselassie Girma
(74) *Attorney, Agent, or Firm* — Capitol IP Law Group, PLLC

(57) ABSTRACT

A method capable of providing a low power geofence service according to the present invention comprises the steps of: detecting a reference Vrect value for estimating an indoor/outdoor position from a solar charger of a position tracker; determining whether the solar charging module (solar charger) of the position tracker is in a charging or non-charging situation, on the basis of the detected Vrect value; if it is determined that the solar charging module of the position tracker is in the charging situation, determining that the position of the position tracker is outdoors and
(Continued)

acquiring position tracking data by using a global positioning system (GPS) module; if it is determined that the solar charger of the position tracker is in the non-charging situation, determining that the position of the position tracker is indoors or in a shaded area, and acquiring position tracking data by using one among Bluetooth low energy (BLEs), wireless fidelity (Wi-Fi), and ultra-wide band (UWB) modules other than the GPS module; and transmitting the acquired position tracking data to a server by using a low power communication scheme.

7 Claims, 11 Drawing Sheets

(51) Int. Cl.
    *H04W 4/33*      (2018.01)
    *H04W 4/70*      (2018.01)
    *G16Y 20/10*      (2020.01)
    *G16Y 40/60*      (2020.01)
    *H04W 4/021*      (2018.01)
    *H04W 52/02*      (2009.01)

(52) U.S. Cl.
    CPC ............... *H04W 4/33* (2018.02); *H04W 4/38* (2018.02); *H04W 4/70* (2018.02); *H04W 52/0277* (2013.01)

(56) References Cited

U.S. PATENT DOCUMENTS 10,149,095 B2 * 12/2018 Lee .................. H04W 52/0254
2014/0143064 A1    5/2014 Tran
2015/0049487 A1 * 2/2015 Connor ............... F21V 33/0008
                                                      362/277
2016/0057268 A1    2/2016 Jiang
2016/0190859 A1 * 6/2016 Blum .................. F41C 33/029
                                                      348/372
2016/0294225 A1 * 10/2016 Blum .................. H02J 7/0042
2018/0131847 A1 * 5/2018 Kokonaski ............. H02J 50/10
2018/0262055 A1 * 9/2018 Schoenbart ............. H01F 27/08

FOREIGN PATENT DOCUMENTS

| | | | | |
|---|---|---|---|---|
| EP | 2983047 | | 2/2016 | |
| JP | 2008-039565 | | 2/2008 | |
| JP | 2008039565 A | * | 2/2008 | |
| KR | 10-2011-0109603 | | 10/2011 | |
| KR | 20110109603 A | * | 10/2011 | |
| KR | 10-2014-0021757 | | 2/2014 | |
| KR | 20140021757 A | * | 2/2014 | |
| KR | 10-2015-0016007 | | 2/2015 | |
| KR | 20150016007 A | * | 2/2015 | ........ H04M 1/72436 |
| KR | 10-2017-0019806 | | 2/2017 | |
| KR | 20170019806 A | * | 2/2017 | ........ H04W 52/0254 |
| KR | 10-2017-0099352 | | 8/2017 | |
| KR | 20170099352 A | * | 8/2017 | |

OTHER PUBLICATIONS

Extended European Search Report dated Sep. 24, 2021, issued in European Patent Application No. 19810348.3.

* cited by examiner

[FIG. 1]
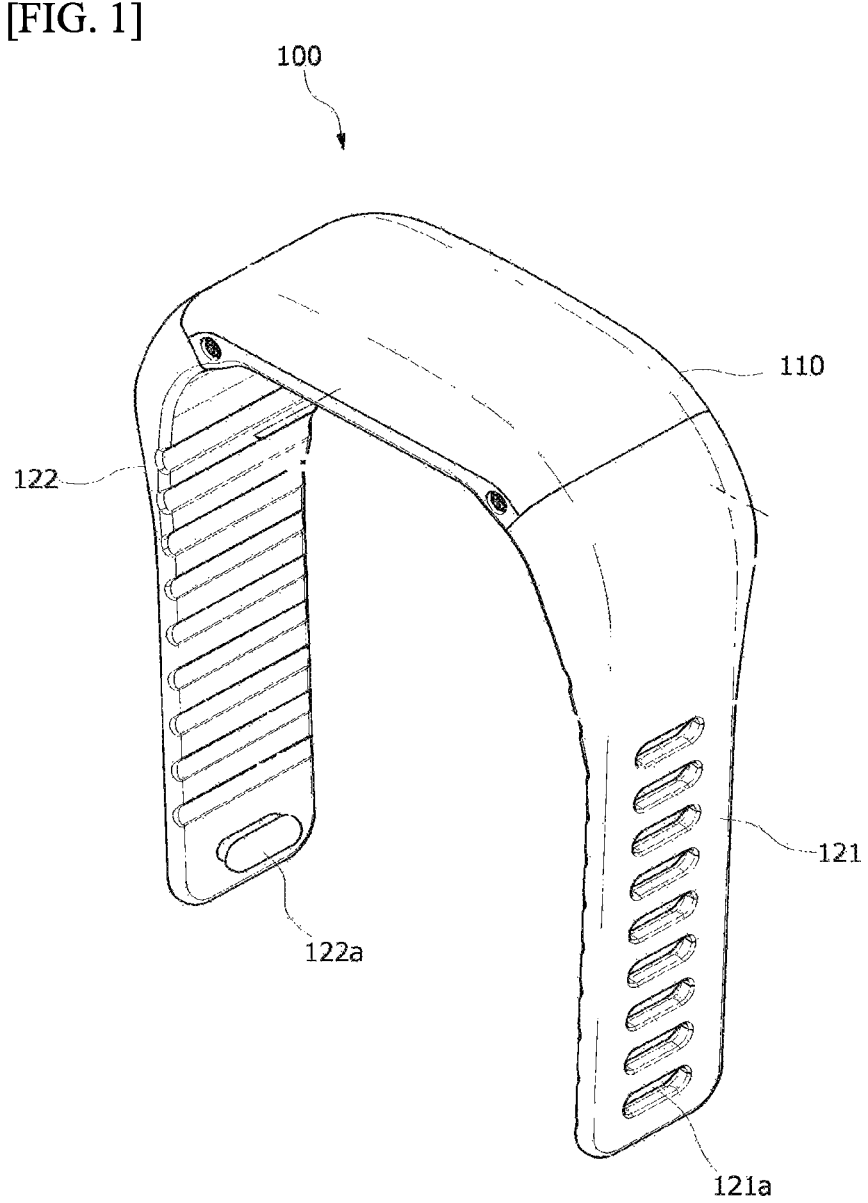

[FIG. 2]
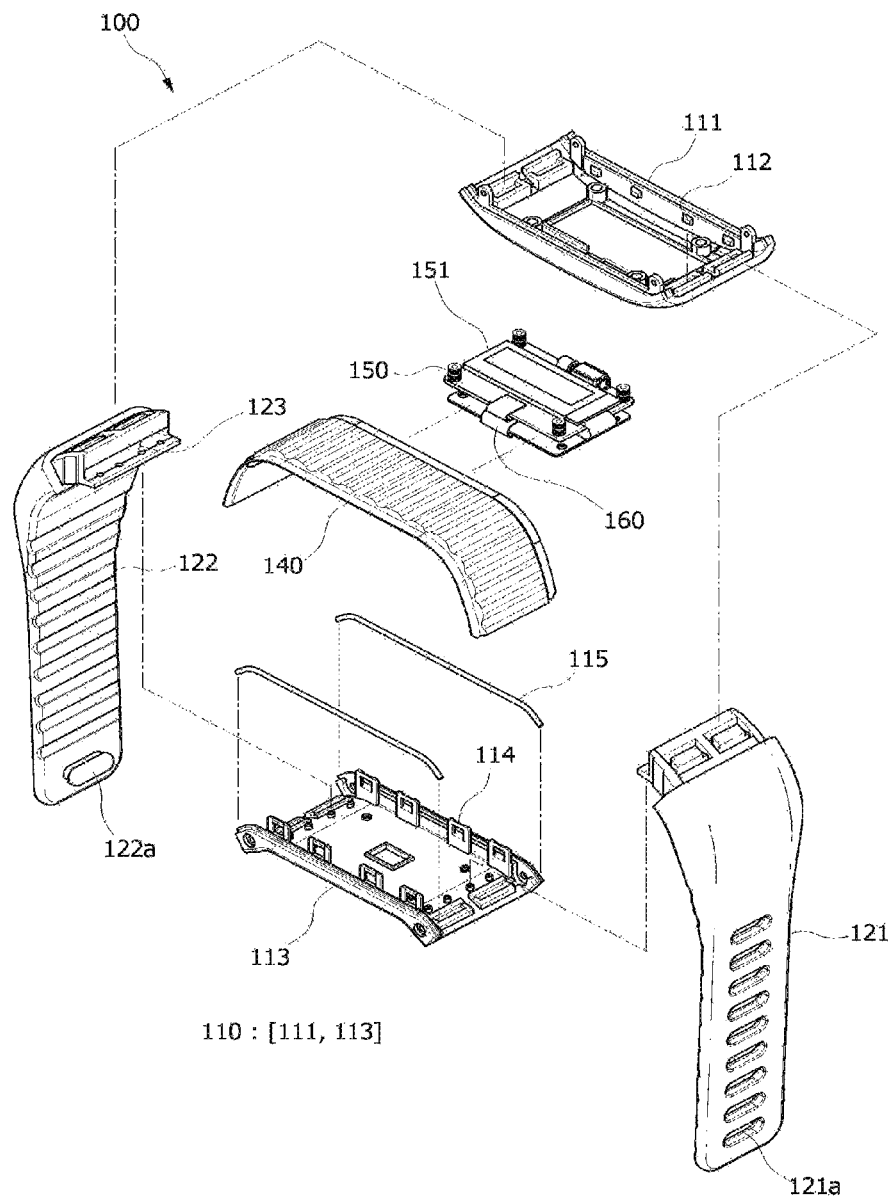

[FIG. 3]
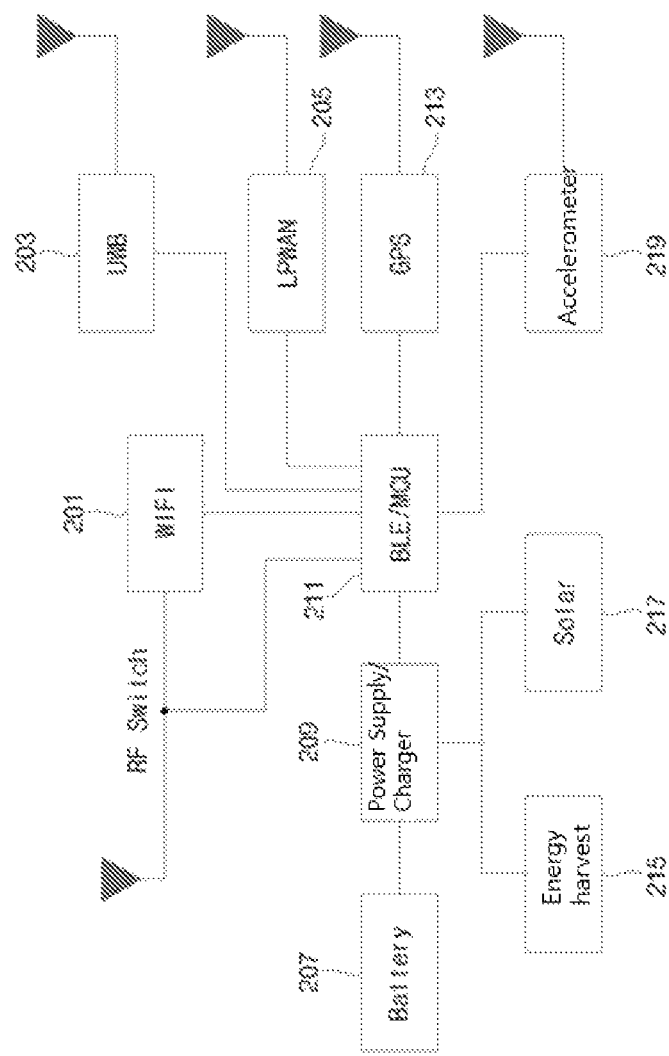

[FIG. 4]
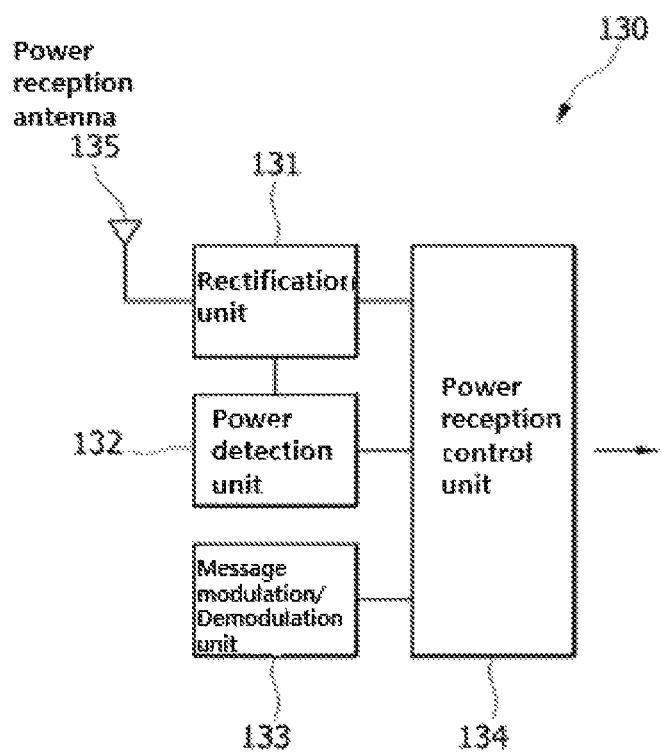

[FIG. 5]
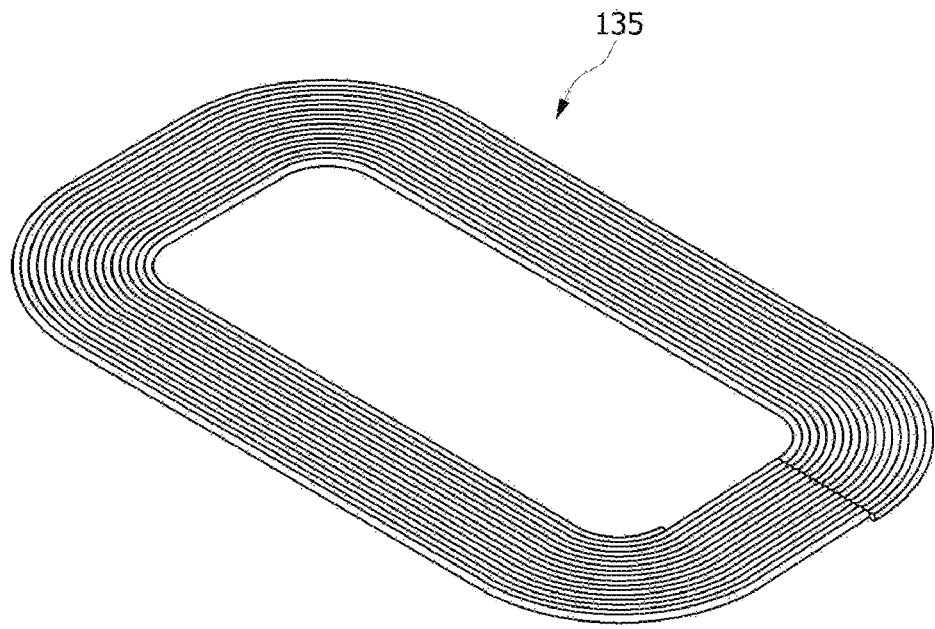
[FIG. 6]
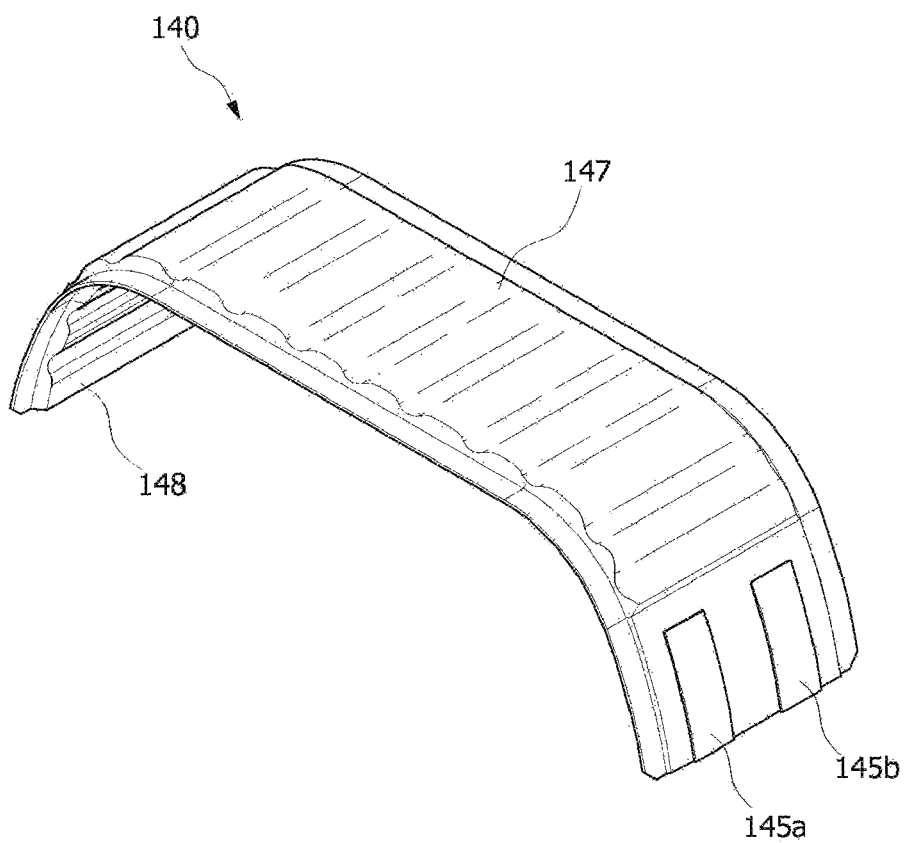

[FIG. 7]
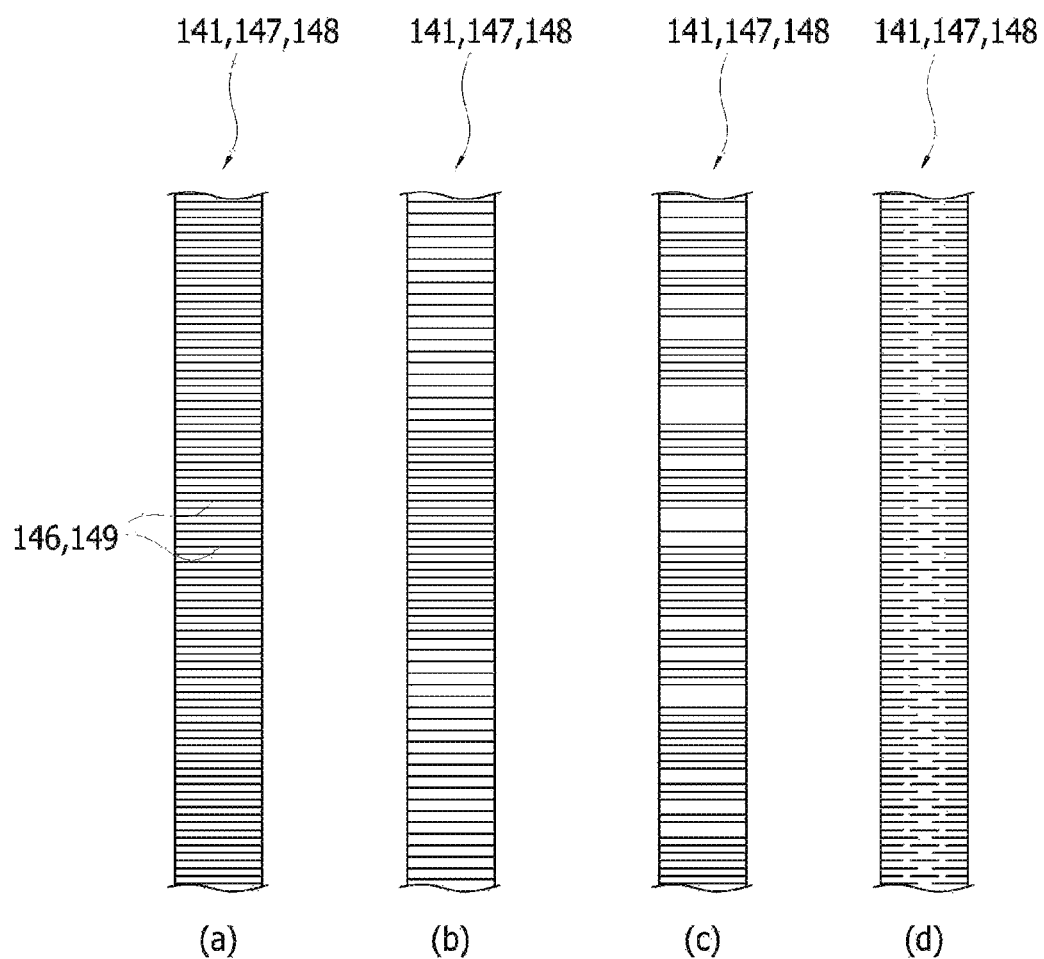

[FIG. 8]
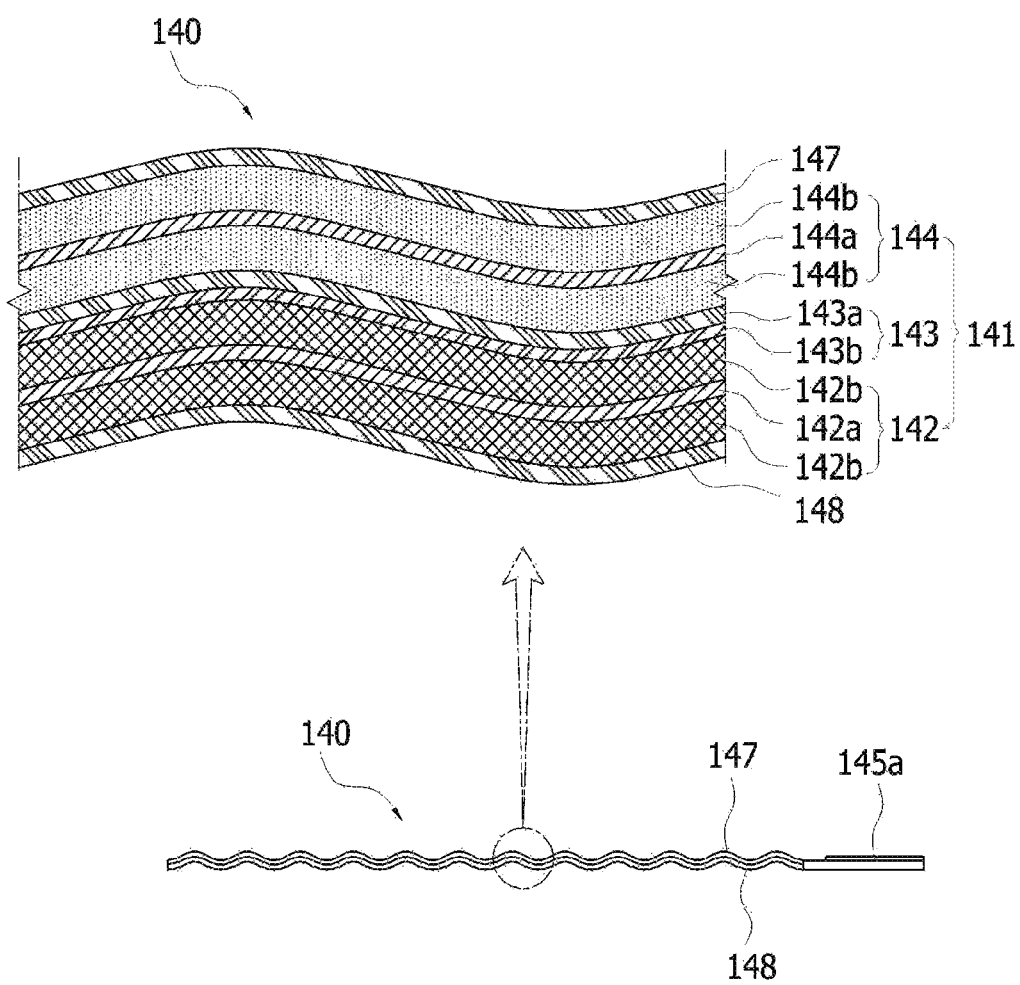

[FIG. 9]
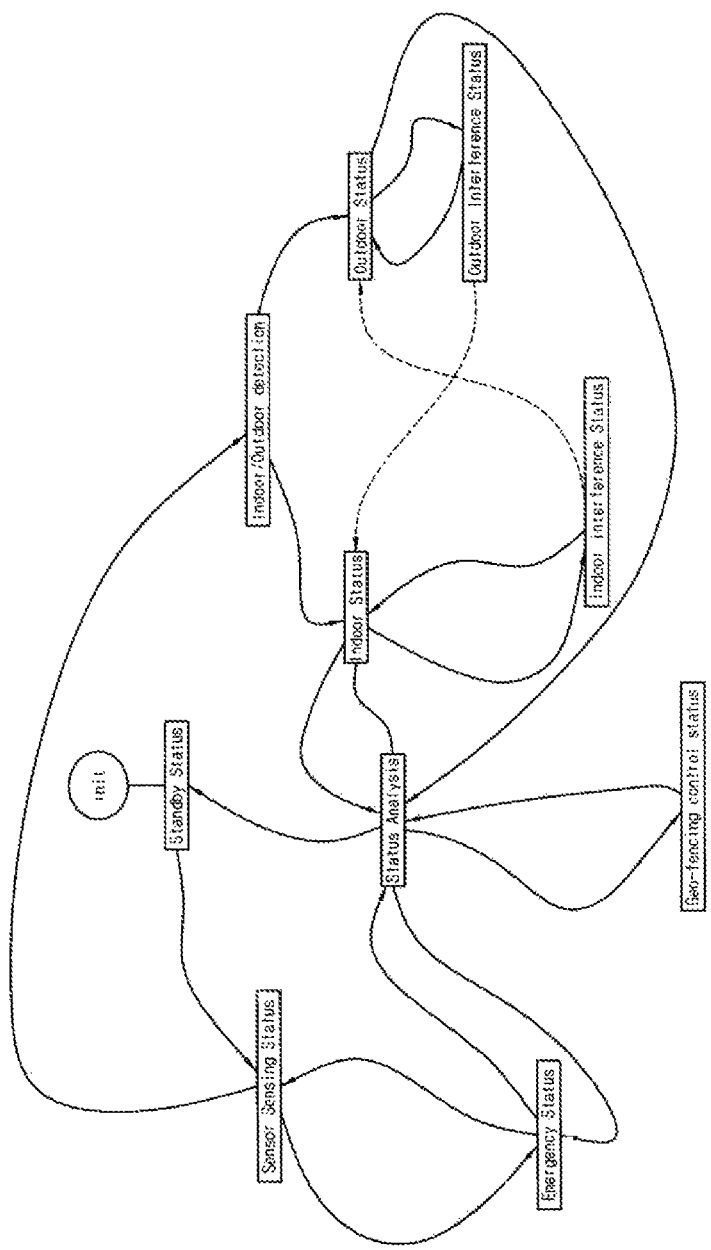

[FIG. 10]
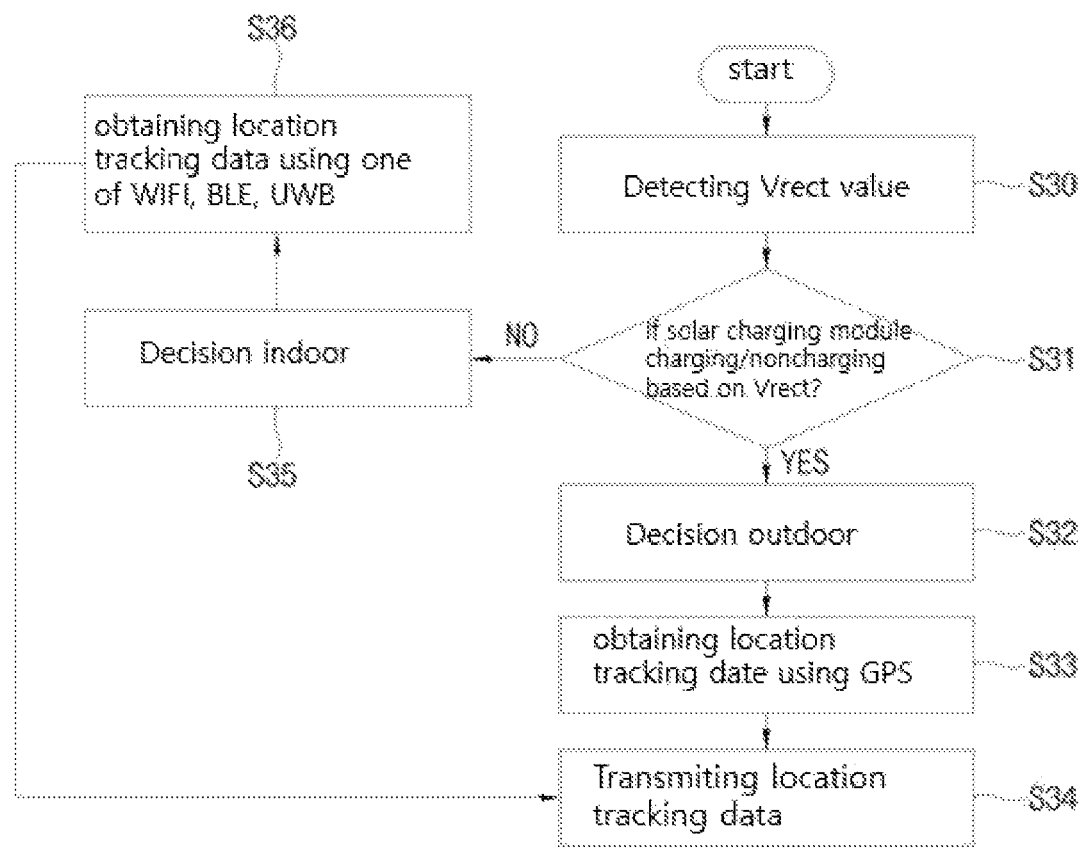

[FIG. 11]
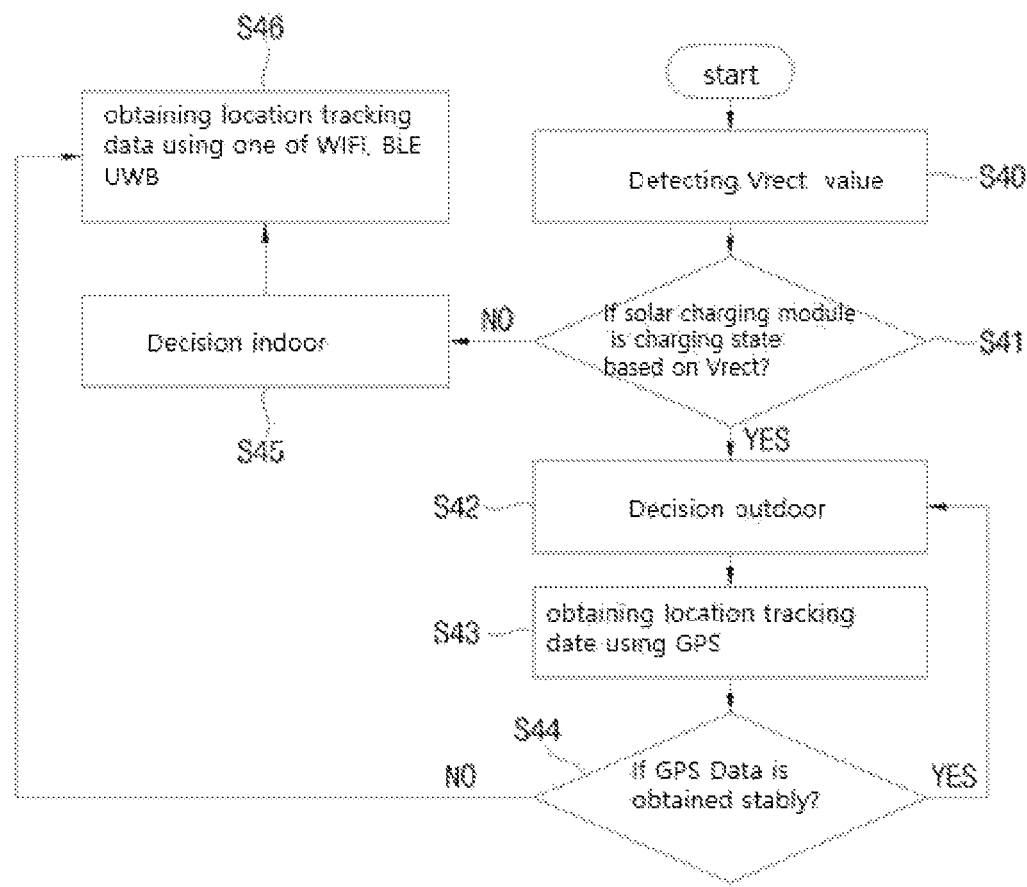

[FIG. 12]
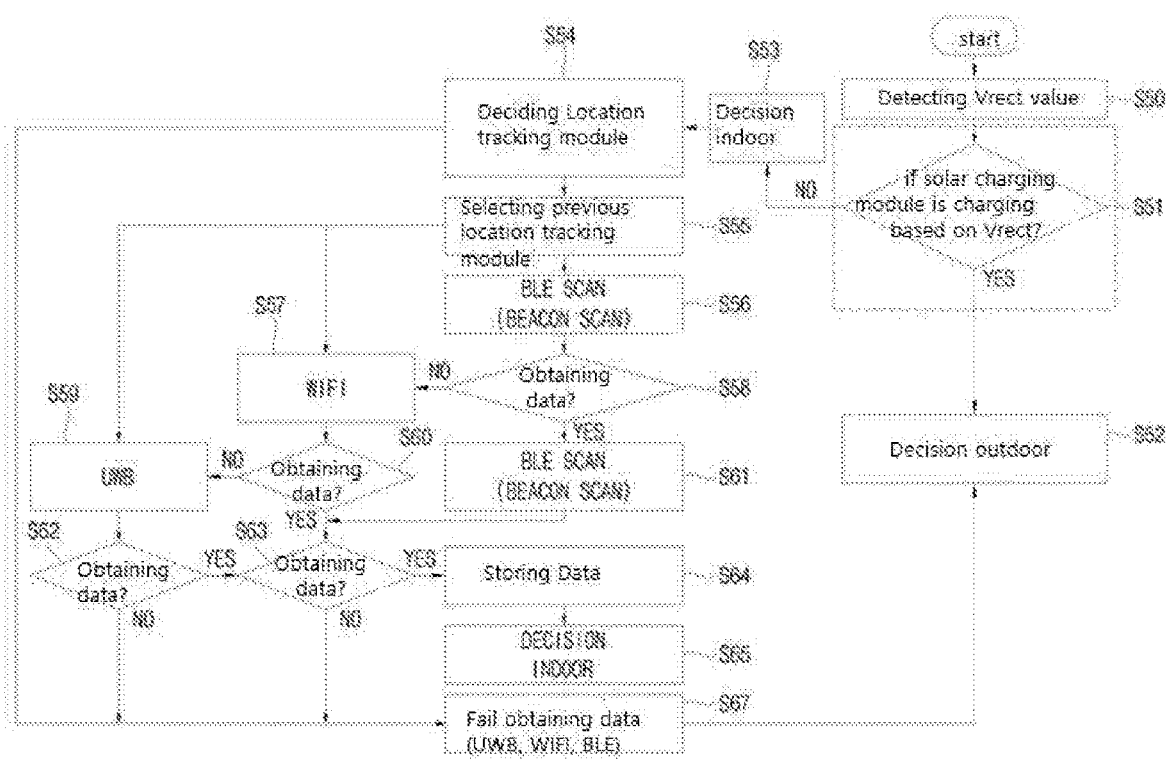

POSITION TRACKING DEVICE AND METHOD FOR PROVIDING LOW POWER GEOFENCE SERVICE

TECHNICAL FIELD

The present invention relates a method and device of location tracking for providing low power consuming geo-fence service by using an indoor/outdoor location information based on solar charging module estimation, in detail, the present invention relates the method and device of location tracking for providing the low-power consuming geo-fence service by selecting a location tracking method according to the indoor/outdoor information decided by operation of the solar charging module.

BACKGROUND ART

Recently, the geo-fence service of location tracking device using the low-power communication have been proposed for the elderly people with dementia to prevent death or injury due to in-home departure and zone departure. In addition, the market for devices for providing such service and communication method targeting elderly people with dementia is expanding to pet and livestock.

In general, the Geo-Fence is a compound word of Geographic and Fence, and refers to a virtual fence installed in a specific geographic area using a location-based service (LBS). The Geo-Fencing is an application program interface (API) that supports the virtual fence on a specific area. The Geo-Fencing is an interface using a Global Positioning System (GPS), which is one of the location tracking technologies, and allows a user to check an access status of virtual fence by designating the virtual fence in the form of a circle or a square in the specific area through the GPS.

However, since the currently used Geo-Fence service is provided using a mobile communication network, a Bluetooth communication, or a Wireless Fidelity (WIFI) communication, the service fee is expensive, or the service is available only in the area where specific communication equipments are installed. Moreover, due to the limitation of the battery capacity of the location tracking device, there have been difficulties in expanding the service.

Accordingly, in order to overcome high cost, tracking distance, and limitation of battery capacity, devices and methods using low power location tracking method and communication method have been proposed.

An effective power consuming Geo-Fence service is needed through combining an advantage of low power communication network, a Soft Ware (SW) platform having compatibility for various data and an effective analysis engine of wearable device such as the location tracking device.

SUMMARY

Technical Problem

It is an object of the present invention to provide a location tracking device for geo-fence service, which has a solar charging module and an energy harvest module for self-power generation and applies a low-power communication method and algorithms.

In addition, it is an object of the present invention relates to a location tracking method capable of providing a geofence service for as long as time by applying a low-power communication method and algorithm using a location tracking device to which a solar charging module and an energy harvest module are applied.

Technical Solution

To solve the above problem and defects, the present invention provides a device of location tracking for providing low power consuming geo-fence service, comprising: a body member; a first bend member and a second bend member; a flexible battery having a predetermined length, inserted into a receiving portion of the first and second band members, and disposed so that the remaining length except for the portion inserted in the receiving portion is located inside the body member; a solar charging module for producing self-power; and a circuit board including at least one of a Wireless Fidelity (WIFI), a Bluetooth Low Energy (BLE), a Global Positioning System (GPS), a real-time communication, a Ultra Wide Band (UWB), a Low Power Wide Area Network (LPWAN) communication module for obtaining a location tracking data and communication with network and a control unit (MCU) for controlling the location tracking device; wherein the control unit changes the communication module to minimize power consumption of the flexible battery according to a detected operation of solar charging module.

In an embodiment of the present invention, wherein control unit determines the communication module as the LPWAN module when a normal situation is detected, wherein the control unit determines the communication module as the UWB module when an emergency situation is detected.

In an embodiment of the present invention, wherein the control unit determines that the location of the location tracking device is outdoor and the location tracking data is obtained using the GPS module when the solar charging module is a charging operation, wherein the control unit determines that the location of the location tracking device is indoor and the location tracking data is obtained by one of the BLE, the WIFI, and the UWB module other than the GPS module when the solar charging module is a non-charging operation.

In an embodiment of the present invention, wherein the LPWAN communication module transmits the locating tracking data through one of a Sigfox, a Long Range (LoRa), and a Narrow Band-Internet of Things (NB-IoT) communication network using a broadcasting communication method, wherein the real-time communication module transmits the locating tracking data through a Long-term evolution (LTE) Category (Cat.) M1 mobile communication network using a bidirectional communication method.

To solve the above problem and defects, the present invention provides a method of location tracking for providing low power consuming geo-fence service in a location tracking device, comprising: detecting a Vrect value which is a reference value for determining a charging or a non-charging operation of the solar charging module; determining whether the solar charging module is charging operation or non-charging operation based on the detected the Vrect value; determining that a location of the location tracking device is outdoor and a location tracking data is obtained using a Global Positioning System (GPS) module when the solar charging module is in the charging operation; determining that a location of the location tracking device is indoor and a location tracking data is obtained using one of a Bluetooth Low Energy (BLE), a Wireless Fidelity (WIFI) Sniffing, and an Ultra-Wide Band (UWB) modules other than the GPS module when the solar charging module is in the non-charging operation; and transmitting the location tracking data through a Low Power Wide Area Network (LPWAN) communication module.

In an embodiment of the present invention, wherein the location tracking data is acquired using the GPS module, further comprising: determining whether the location tracking data obtained using the GPS module is stably obtained; and if the location tracking data is not stably obtained using the GPS module, determining the location of the location tracking device is indoor and obtaining the location tracking data using one of the BLE, the WIFI, and the UWB module.

In an embodiment of the present invention, wherein the location tracking data is acquired by one of the BLE, the WIFI, and the UWB module other than the GPS module, further comprising: determining whether location tracking data is stably obtained using the location tracking module used before determining the location of the location tracking device is indoor according to the solar charging module, searching other location tracking module which is most stably obtainable the location tracking data when the location tracking data is not stably obtained using the used location tracking module, and obtaining the location tracking data by the searched location tracking module.

In an embodiment of the present invention, wherein the LPWAN communication module transmits the locating tracking data through one of a Sigfox, a Long Range (LoRa), and a Narrow Band-Internet of Things (NB-IoT) communication network using a broadcasting communication method.

In an embodiment of the present invention, the location tracking device includes status definitions that a Standby Status referring a standby state after the initialization of the location tracking device, a Sensor Sensing Status referring a state that measures a heart rate, a body temperature, and an acceleration, an Emergency Status referring a state of processing when the defined emergency situation is occurred, a Status Analysis referring a state of analyzing and managing information from each status, an Indoors/Outdoors detection referring a state of analyzing whether the location of the location tracking device is indoor or outdoor, an Indoor Status referring a state of processing and managing when the location of the location tracking device is indoor, an Outdoor Status referring a state of processing and managing when the location of the location tracking device is outdoor, an Indoor Interference Status referring a state of checking and observing the change of location data indoor, an Outdoor Interference Status referring a state of checking and observing the change of location data in the outdoor, a Geo-Fencing Control Status referring a state of processing when the user deviates from the geo-fence.

In an embodiment of the present invention, wherein the Vrect value is the reference value determining that the location tracking device is indoor and the reference value determining that the location tracking device is outdoor.

Advantageous Effects

The effect of the present invention is to increase the power supply amount of the location tracking device by producing self-generation power of solar charging module and the energy harvesting module in the location tracking device, thereby providing long time geo-fence service in location tracking device.

That is, the location tracking module can be quickly selected according to the indoor/outdoor location information of the location tracking device to which the solar charging module is applied, thereby reducing power consumption for searching the location tracking module of the location tracking device.

In addition, the flexible battery to be accommodated in the body member, the first band member, and the second band member of the location tracking device can increase the battery size compared to a wearable device in which a general battery is embedded only in the body member.

However, the effects of the present invention are not limited to the above effects, and may be variously extended without departing from the spirit and scope of the present invention.

BRIEF DESCRIPTION OF THE DRAWINGS

FIG. 1 is a view showing a location tracking device according to an embodiment of the present invention.

FIG. 2 is an exploded perspective view of the location tracking device of FIG. 1

FIG. 3 is a block diagram of modules configured on a circuit board inside the body of the location tracking device according to the present invention.

FIG. 4 is a configuration diagram of a wireless power transmission unit included in the location tracking device according to the present invention.

FIG. 5 shows a power receiving antenna included in the wireless power transmission unit.

FIG. 6 is a diagram illustrating a flexible battery extracted from the location tracking device according to the present invention.

FIG. 7 is an exemplary view showing various patterns applied to the electrode assembly and the exterior material in the flexible battery of FIG. 6, and is a view showing various distances between adjacent valleys or hills of the exterior material in the flexible battery.

FIG. 8 is an enlarged view of the inside of the flexible battery of FIG. 6.

FIG. 9 is a state definition and various state transition diagrams for recognizing a situation of the location tracking device according to the present invention.

FIG. 10 is a flowchart of method for providing a low-power geo-fence service based on the location tracking device according to the present invention.

FIG. 11 is a flowchart of method for determining a location of the location tracking device of FIG. 1 to be outdoor and obtaining location tracking data using a GPS module.

FIG. 12 is a flowchart of method for determining location of the location tracking device of FIG. 1 to be indoor and obtaining location tracking data using any one of a BLE, a WIFI, and a UWB module.

DETAILED DESCRIPTION OF THE EMBODIMENTS

Hereinafter, exemplary embodiments of the present disclosure will be described in detail with reference to the accompanying drawings, which will be readily apparent to those skilled in the art to which the present disclosure pertains.

The present disclosure may be embodied in many different forms and is not limited to the embodiments described herein. In the drawings, portions not relating to the description are omitted for clarifying the present disclosure, and the same reference numerals are assigned to the same or similar components throughout the specification.

The present invention is based on a Sigfo, a Long Range (LoRa), a Narrow Band Internet of Things (NB-IoT) based on the advantages of the location tracker, such as bio-signal monitoring, a light weight analysis engine based on monitored data, and SW platform structure compatible with data. It is based on the functional combination of low-power and long-distance data transmission, which is an advantage of the communication method. This invention may provide a method to increase the synergy effect with the low-power and low-cost through the combination.

The location tracking device 100 according to an embodiment of the present invention, as shown in FIGS. 1 and 2 may include a body member 110, a first band member 121, a second band member 122 and a flexible battery 140.

The body member 110 may have a circuit board including various modules for geo-fence service (FIG. 4). Accordingly, the user may be tracked while wearing the location tracking device 100 according to an embodiment of the present invention.

The body member 110 may include, for example, an upper portion 111 and a lower portion 113. The flexible battery 140 and modules to be described later may be located between the upper portion 111 and the lower portion 113. The coupling structure of the upper portion 111 and the lower portion 113 may, for example, form a locking jaw 112 on an inner surface of the upper portion 111 and a locking ring 114 on an inner surface of the lower portion 113.

The number and position of each of the locking jaws 112 and the locking rings 114 may correspond to each other one-to-one. In addition, fastening the upper portion 111 and the lower portion 113 with bolts may be to facilitate repair and maintenance and to improve the fastening force of the location tracking device 100 according to an embodiment of the present invention.

Meanwhile, a sealing ring 115 may be interposed between portions of the body member 110 in which the upper portion 111 and the lower portion 113 are in close contact with each other. The sealing 115 may be formed in line shape and may be positioned along a portion where the upper portion 111 and the lower portion 113 are in close contact. The material of the sealing 115 may be, for example, rubber, silicone and synthetic resin. The sealing 115 may seal a gap between the upper portion 111 and the lower portion 113 to prevent moisture or foreign substances from entering the body member 110 from the outside.

The first band member 121 and the second band member 122 may be respectively coupled to both ends of the body member 110.

The fastening structure of the first band member 121 and the second band member 122 may be, for example, to form a plurality of coupling holes 121a at regular intervals along the longitudinal direction of the first band member 121. Then, a coupling protrusion 122a may be formed on one side surface of the end of the second band member 122. Depending on the circumference of the user's wrist, the coupling protrusion 122a may be coupled to any one of the pluralities of coupling holes 121a.

However, the fastening structure of the first band member 121 and the second band member 122 may be not limited to the above structure, and any of the first band member 121 and the second band member 122 may be used as long as they are stably coupled to each other. Accordingly, the first band member 121 and the second band member 122 may be freely deformed by an external force to be in close contact with the user's wrist.

The material of the first band member 121 and the second band member 122 may be, for example, Thermoplastic Poly Urethane (TPU). Accordingly, the first band member 121 and the second band member 122 may be freely deformed by an external force to be in close contact with the user's wrist.

As described above, since the first band member 121 and the second band member 122 are made of TPU for the compression deformation by external force, the gap may be prevented from being generated in a portion coupled with the body member 110.

However, the first band member 121 and the second band member 122 are not limited to being the TPU, and may be any materials that are deformed by external force and restored to their initial shape.

A portion of the flexible battery 14 may be accommodated inside the body member 100, and the other ends of the flexible battery 14 may be accommodated inside the first band member 121 and the second band member 122.

For example, the middle portion of the flexible battery 140 may be accommodated in the body member 110. In addition, the other ends of the flexible battery 140 may be accommodated in each of the first band member 121 and the second band member 122. That is, one flexible battery 140 may be built to span the body member 110, the first band member 121, and the second band member 122.

With this structure, the length of the flexible battery 140 may be increased compared to a structure in which a general battery is embedded only in the body member 110. Therefore, the storage capacity of the flexible battery 140 may be also increased to increase the use time of the location tracking device 100 according to an embodiment of the present invention.

Meanwhile, each of the first band member 121 and the second band member 122 may include a receiving portion 123 in which a portion of an end of the flexible battery 140 is accommodated in a portion coupled to the body member 110.

The receiving portion 123 may be formed to have a size relatively larger than that of the flexible battery 140. This is to allow the flexible battery 140 to be freely deformed in the receiving portion 123.

The wrinkled portion of the flexible battery 140 may be freely bent along with deformation of the first band member 121 and the second band member 122. The flexible battery 140 for this may be made to have a length as an example. In addition, all or a portion of a portion accommodated in the receiving portion 123 in the flexible battery 140 may be formed to be wrinkled. For example, only the portion accommodated in the receiving portion 123 in the flexible battery 140 may be wrinkled.

In flexible battery 140, the first band member 121 and the second band member 122 among the portions accommodated in the first band member 121 and the second band member 122 may be deformed by an external force to form wrinkles.

Alternatively, in the flexible battery 140, a portion accommodated in the body member 110 may be plate-shaped, and the remaining portions may be formed to be wrinkled. Accordingly, since the entire thickness of the body member 110 may be reduced by a thickness increased by wrinkles in the flexible battery 140, the appearance of the location tracking device 100 according to an embodiment of the present invention may have a good shape and also improve a wearing sensation.

On the other hand, the location tracking device 100 according to an embodiment of the present invention in more detail, may include a wireless power transmission unit (see FIG. 4, 130), a circuit board 150 on which various modules are mounted, and a connecting member 160.

The wireless power transmission unit 130 may be located inside the body member 110 to receive wireless power to supply power to the flexible battery 140. That is, the above-described flexible battery 140 may be charged by the wireless power transmission unit 130. The method for the wireless power transmission unit 130 to receive power may be, for example, a magnetic resonance method or a magnetic induction method, but is not limited thereto, and any method may be used as long as it can receive power wirelessly.

The circuit board 150 may be located inside the body member 110 and positioned above the flexible battery 140. Various modules for operating the location tracking device 100 according to an embodiment of the present invention may be mounted on the circuit board 150.

As shown in FIG. 3, a WIFI 201, a UWB 203, a LPWAN 205, a GPS 213, a accelerometer 219, a BLE/MCU 211, a solar charging module, a battery 207, an energy harvest module 215, a power/charging 209 modules may be mounted in the circuit board 150. In addition, an overcharge protection circuit that prevents overcharging of the flexible battery 140 may also be mounted on the circuit board. In addition, the vibration unit 152 through which the user can feel vibration may be mounted on the circuit board 150.

The WIFI 201 may be a wireless local area net-work (WLAN) that converts a wired LAN transmission method to suit a wireless environment and can be used for location tracking when in an indoor environment.

The UWB 203 may be for a high-speed transmission of 500 Mbps, which is about 10 times the speed of a wireless LAN, which is about 54 Mbps. Therefore, the UWB 203 may be used to implement two-way services such as automotive Intelligent Transport System (ITS) communication and disaster rescue communication.

LPWAN (205) may be used as a dedicated internet of things (IoT) network providing communication speeds of several hundred kbps per base station at a distance of about 10 km.

The battery 207, the flexible battery, and the energy harvesting device using a Peltier element may be provided as a separate power source for supplying auxiliary power to the circuit board.

The BLE 211 which is the location tracking communication method may be used for location tracking in the indoor environment.

The GPS 213 may be a satellite navigation system that receives the signal from a GPS satellite and used for location tracking in the outdoor environment.

The accelerometer 219 may be a device for measuring acceleration, and a means for detecting a sudden change in user behavior and grasping a fall-down or other emergency.

In one embodiment of the present invention, the solar charging module 217 may be for solar charging when the position of the location tracking device is in the outdoor state.

The energy harvest module 215 may be a module of producing self-power by using a change in body temperature of person or animal, and expand the amount of power of location tracking device 100 combined with the solar charging module 217 and the flexible battery 140.

The other control unit (MCU, 211) may be in charge of controlling all the modules in the location tracking device.

The control unit 211 of the location tracking device 100 may determine whether it is an emergency or a normal (or peaceful) situation based on information of situation recognition of the location tracking device 100. If it is determined that the situation is the normal, the LPWAN 205 module may be used to transmit the location tracking data of the location tracking device to the low-power communication network.

If it is determined that it is the emergency, the UWB module may be used to transmit the emergency message and the location tracking data of the location tracking device to network for real-time and bidirectional communication. That is, by switching the communication method according to the situation, the location tracking data may be usually transmitted to the network in a low-power communication method. However, in the event of an emergency, the location tracking data may be transmitted to the network by switching to the real-time communication method even if the power consumption is high.

Therefore, in the outdoor state, the solar charging module 217 may be activated, and the charged power of solar charging module 217 may be provided to the location tracking device 100.

In addition, if the solar charging module 217 is in a charging situation by determining the charging/non-charging state based on the history value of the solar charging module 217, the location of the location tracking device 100 may be determined in the outdoor. When the location of the location tracking device 100 is in the outdoor, the GPS Module 213 may be used to measure the location value of the location tracking device to the network. In addition, if the solar charging module 217 is in a non-charging situation by determining the charging/non-charging state based on the history value of the solar charging module 217, the location of the location tracking device 100 may be determined indoor. When the location of the location tracking device 100 is indoor, the one of the BLE 211, the WIFI 201 and the UWB 203 modules other than the GPS 213 module may be used for tracking the location data of the location tracking device.

Low-power communication module transmits the locating tracking data through one of a Sigfox, a Long Range (LoRa), and a Narrow Band-Internet of Things (NB-IoT) communication network using a broadcasting communication method.

The connecting member 160 may be electrically connected to the circuit board 150. One end of the connecting member 160 for this purpose may be coupled to the circuit board 150. In addition, the other end of the connecting member 160 may be positioned below the flexible battery 140.

The location tracking device 100 according to an embodiment of the present invention may include a display module 151. The display module 151 may be located on the circuit board 150. The display module 151 may display an operation state of the location tracking device 100 according to an embodiment of the present invention.

Meanwhile, for example, the display module 151 may be a flat display panel positioned at a predetermined distance from the upper portion 111 of the body member 110. Alternatively, the display module 151 may be a flexible display panel as another example.

At this time, the outer surface of the upper portion 111 of the body member 100 may be a curved surface. In addition, the inner surface of the upper portion 111 of the body member 110 may also be a curved surface. For example, a cover window may be formed on the outer surface of the upper portion 111.

The flexible display panel may be attached to the cover window in the curved state. Accordingly, by outputting an image in the curved state from the flexible display panel, the image may be output to the flexible display panel even if the user watches from various angles while wearing the location tracking device 100 according to an embodiment of the present invention. Since the flexible display panel is a known flexible display panel, detailed description thereof will be omitted.

In the location tracking device 100 according to an embodiment of the present invention described above, the upper portion 111 of the body member 100 from the top to the bottom, the display module 151, the circuit board 150, the flexible battery 170 and the lower portion 113 of the body member 110 may be sequentially positioned.

Meanwhile, the connection member 160 may be a flexible printed circuit board (FPCB).

Meanwhile, the aforementioned wireless power transmission unit 130 may receive power from an external power supply (not shown). Here, since the external power supply is a known wireless charger, detailed descriptions of the structure and operation process thereof may be omitted.

When the wireless power transmission unit 130 is described in more detail, as illustrated in FIG. 5, the wireless power transmission unit 130 may include, for example, a rectification unit 131, a power detection unit 132, and a message modulation/demodulation unit 133, a power reception control unit 134, and a power reception antenna 135.

The rectifying unit 131 may perform full-wave rectification to convert a wireless power signal in an Alternating Current (AC) state received from the power receiving antenna 135 into a Direct Current (DC). The rectifying unit 131 may further include a smoothing circuit for making the rectified current into a flat and stable direct current.

The power detection unit 132 may monitor the voltage or current of the power rectified by the rectification unit 131.

The message modulation/demodulation unit 133 may be used to demodulate the wireless power signal by the power reception control unit 134 and transmit the power control message signal.

The power reception control unit 134 may control each component included in the wireless power transmission unit 130.

Referring to FIG. 6, the power receiving antenna 135 may be formed in various shapes and sizes according to the wireless charging method of the wireless power transmission unit 130.

The power receiving antenna 135 may be formed by patterning a conductor such as copper foil on at least one surface of the synthetic resin or forming a loop-shaped metal pattern using conductive ink.

For example, the power receiving antenna 135 may be, for example, a flexible printed circuit board antenna. The flexible printed circuit board antenna may be an antenna pattern printed on a flexible printed circuit board.

The power receiving antenna 135 may have a size similar to that of the circuit board 150 described above, or may be relatively smaller than the circuit board 150, but is not limited thereto.

The power receiving antenna 135 may have an overall shape in a film shape, and an adhesive layer may be formed on each of both sides. Accordingly, one surface of the receiving power antenna 135 may be attached to the connecting member 160, and the other surface may be attached to another adjacent member. To this end, the portion of the connection member 160 to which the power receiving antenna 135 is attached may be formed to have a size corresponding to the circuit board 150. With this structure, the assembly of the location tracking device 100 according to an embodiment of the present invention may be quickly implemented.

On the other hand, the location tracking device 100 according to an embodiment of the present invention, although not shown other than the antenna for wireless power transmission as described above, the location tracking device 100 may also be configured as a combo type that further includes at least one of an antenna for magnetic secure transmission (MST) and an antenna for near field communication (NFC).

In this case, the location tracking device 100 according to an embodiment of the present invention may include a shielding sheet 136. The shielding sheet 136 may be located between the power receiving antenna 135 and the flexible battery 140.

As described above, the shielding sheet 136 may be adhered to the power receiving antenna 135 by adhesion formed on one surface of the power receiving antenna 136. The shielding sheet 136 may shield the magnetic field generated by the radio signal induced by the antenna and focus in a desired direction.

The shielding sheet 136 may be a ferrite sheet or an amorphous sheet made of a plate-like member having a predetermined area, or a hybrid sheet formed by stacking them. The ferrite sheet may be made of a sintered ferrite sheet, and may be made of MnZn ferrite or NiZn ferrite. In addition, the amorphous sheet may be a ribbon sheet including at least one of an amorphous alloy and a nanocrystalline alloy, and the ribbon sheet may be stacked in multiple layers, and the flakes processing may be performed by separated into a plurality of fine pieces, and the gaps between the separated fine pieces may be isolated by filling with an adhesive.

As described above, the location tracking device 100 according to the present invention may include the wireless power transmission unit 130 so that charging can be performed as long as it is located on the charging stand. Accordingly, since the location tracking device 100 according to the present invention can be charged using the wireless charger without connecting the charging cable to the body member 110, unlike the conventional location tracking device, convenience in use can be improved.

In addition, in the conventional wired charging method, a charging port, which is an essential component for connecting the charging cable, does not have to be provided, thereby preventing failure due to foreign matter and moisture. In addition, the user may very easily handle and manage the location tracking device 100. In addition, the location tracking device 100 according to the present invention does not have the charging port through which the inside of the body member 110 is exposed to the outside, thereby improving the cohesiveness and easily implementing a structure for waterproofing.

In addition, since the location tracking device 100 according to the present invention can additionally utilize as much space as the space occupied by the charging port, the design freedom can be increased by adding additional functions or changing innovative design.

Meanwhile, referring to FIGS. 7 to 8, the above-described flexible battery 140 may include, for example, an electrode assembly 141 and exterior materials 147 and 148, and the electrode assembly 141 may include the exterior material 147 together with an electrolyte.

At this time, the electrode assembly 141 and the exterior materials 147 and 148 are provided with patterns 146 and 149 for contraction and relaxation in the longitudinal direction, respectively, and a first pattern formed on the exterior materials 147 and 148 and a second pattern 146 formed on the electrode assembly 141 may be provided to have the same directionality with each other.

Through this, since the amount of deformation of the base material constituting the electrode assembly 141 and the exterior materials 147 and 148 is prevented or minimized, the amount of deformation of the substrate itself that can occur in the bent portion is minimized. It is possible to prevent the electrode assembly 141 and the exterior materials 147 and 148 from being damaged or deteriorating.

In this case, the first pattern 149 and the second pattern 146 are arranged such that the first pattern 149 and the second pattern 146 may coincide with each other as well as the same directionality. This is to ensure that the first pattern 149 and the second pattern 146 always have the same moving.

In this way, the flexible battery 140 may be formed so that the patterns 146 and 149 for contraction and displacement in the longitudinal direction generated coincide with the electrode assembly 141 and the exterior materials 147 and 148, when bending is occurred. Even if the warp in the direction occurs, the electrode assembly 141 and the exterior materials 147 and 148 may be able to maintain a uniform spacing or contact state with respect to the entire length. Therefore, the electrolyte solution sealed together with the electrode assembly 141 may be uniformly distributed over the entire length, so that performance of the battery may be prevented from deteriorating.

To this end, the first pattern 149 and the second pattern 146 may be formed in a parallel direction to the width direction of the exterior portions 147 and 148 and the electrode assembly 141, respectively, and the exterior portions 147 and 148 and the electrode assembly 141 along the longitudinal direction may be alternately arranged in the hills and valleys. In addition, the hills and valleys constituting the first pattern 149 and the second pattern 146 may be formed at the same position, so that the first pattern 149 and the second pattern 146 may be coincide with each other.

In detail, the hills and valleys of the first pattern 149 and the second pattern 146 may be parallel direction to the straight lines parallel to the width direction of the exterior materials 147 and 148 and the electrode assembly 141. The hills and valleys of the first pattern 149 and the second pattern 146 may be repeatedly arranged along the longitudinal direction.

At this time, the patterns 246 and 149 may be continuously formed in a direction parallel to the width direction of the electrode assembly 141 and the exterior materials 147 and 148, or formed discontinuously. The pattern 246 and 149 may be formed for the entire length of the electrode assembly 141 and the exterior materials 147 and 148, or formed partially for some lengths.

For example, the patterns 146 and 149 of the flexible battery 140 may be formed in portions accommodated in the first band member 121 and the second band member 122. The patterns 146 and 149 of the flexible battery 140 may be formed only in portions where the first band member 121 and the second band member 122 are deformed by external force among the portions accommodated in the first band member 121 and the second band member 122.

Returning to FIG. 8, the hill and valley portions may be provided to have a cross-section of various shapes in which an arc-shaped cross section including a semicircle, a polygonal cross section including a triangle or a square, and an arc-shaped cross section and a polygonal cross section may be mutually combined. Each of the peaks and valleys may be provided to have the same pitch and width, but may be provided to have different pitches and widths.

Through this, even if the exterior materials 147 and 148 and the electrode assembly 141 are embedded in a curved state, fatigue applied to itself may be reduced through the patterns 146 and 149.

On the other hand, the first pattern 149 and the second pattern 146 may be formed to have the same distance the interval between valleys adjacent to each other and the interval between hills adjacent to each other, or may be provided to have different intervals. The same interval and each other intervals may be provided in combination.

In addition, the first pattern 149 formed on the exterior materials 147 and 148 may be formed on the entire surface of the exterior materials 147 and 148, but may be partially formed. For example, as described above, the first pattern 149 may be formed only in portions accommodated in the first band member 121 and the second band member 122 in the exterior materials 147 and 148.

The electrode assembly 141 may be sealed with an electrolyte inside the exterior materials 147 and 148 and include an anode 142, a cathode 144, and a separator 143.

The positive electrode 142 may include a positive electrode current collector 142a and a positive electrode active material 142b, and the negative electrode 144 may include a negative electrode current collector 144a and a negative electrode active material 144b, and the positive electrode current collector 142a and the negative electrode current collector 144a may be implemented in the form of a sheet having a predetermined area.

That is, the positive electrode 142 and the negative electrode 144 may be provided for the entire area of the active materials 142b and 144b on one or both surfaces of each current collector 142a and 144a, or partially provided for some areas.

In addition, the positive electrode current collector 142a and the negative electrode current collector 144a may have negative electrode terminals 145a and positive electrode terminals 145b, respectively, for electrical connection with the outside. Here, the positive electrode terminal 145b and the negative electrode terminal 145a may be provided in a form extending from the positive electrode current collector 142a and the negative electrode current collector 144a to protrude on one side of the exterior bodies 147 and 148. Here, the positive electrode terminal 145b and the negative electrode terminal 145a may be provided to be exposed on the surfaces of the exterior materials 147 and 148.

At this time, the positive electrode active material 142b and the negative electrode active material 144b may contain a polytetrafluoroethylene (PTFE) component. This is to prevent the positive electrode active material 142b and the negative electrode active material 144b from peeling or cracking from the current collectors 142a and 144a during bending.

Meanwhile, the separator 143 disposed between the anode 142 and the cathode 144 may include a nanofiber web layer 143b on one or both surfaces of the nonwoven layer 143a.

Here, the nanofiber web layer 143b may be a nanofiber containing at least one selected from polyacylonitrile nanofibers and polyvinylidene fluoride nanofibers.

Preferably, the nanofiber web layer 143b may be composed of polyacrylic knit nanofibers only to ensure radioactivity and uniform pore formation.

The exterior materials 147 and 148 may be formed of a plate-shaped member having a predetermined area, and may be intended to protect the electrode assembly 141 from external force by receiving the electrode assembly 141 and an electrolyte therein.

To this end, since the exterior materials 147 and 148 may be provided with a pair of first exterior materials 147 and a second exterior material 148, and sealed through an adhesive along the rim, the electrolyte solution and the electrode assembly 141 accommodated therein are prevented from being exposed to the outside and prevented from leaking to the outside.

After the first exterior material 147 and the second exterior material 148 are composed of two members, the exterior materials 147 and 148 may be sealed with an edge portion constituting the sealing portion through an adhesive. The exterior materials 147 and 148 are made of a single member, and after being folded in half along the width direction or the length direction, the rest of the contact portions may be sealed through an adhesive.

The flexible battery 140 may be freely deformed by an external force by having the above-described structure.

FIG. 9 is a state definition and various state transition diagrams for state recognition of the location tracking device 1 for the present invention.

Referring to FIG. 9, the Standby Status may refer a standby status after the initialization of the location tracking device 1, at which time a system check of the location tracking device 1 is performed.

A Sensor Sensing Status may refer a status that measures a heart rate, a body temperature, and an acceleration, and checks whether this state is an emergency or not.

An Emergency Status may refer a status of processing when the emergency state occurs according to the definition of the emergency.

A Status Analysis may mean a status that is in charge of analyzing and managing information from each status.

An Indoors/Outdoors detection may mean a location analysis on whether the location of the location tracking device 1 is in an indoor or an outdoor.

An Indoor Status may refer a status of processing and managing when the location of the location tracking device 1 is in the indoor.

An Outdoor Status may refer to a status of processing and managing when the location of the location tracking device 1 is in the outdoor.

An Indoor Interference Status may refer a status of checking and observing the change of location data in the indoor.

An Outdoor Interference Status may refer a status of checking and observing the change of location data in the outdoor.

A Geo-Fencing Control Status may refer a status in which a processing for the location tracking device 1 when the user leaves the geo-fence.

Referring to FIG. 9, all status can be transitioned to other status at any time or freely.

FIG. 10 is a flowchart of method for providing a low-power geo-fence service based on the location tracking device according to the present invention.

Based on the history value of the solar charging module 217 of the location tracking device 100, a Vrect value serving as a reference value for determining a charging/non-charging state of the solar charging module 217 may be decided (S30). Here, the Vrect value may be a reference value to determine that the location of the location tracking device 100 is indoor or shaded area. The Vrect value may be a reference value to determine that the location of the location tracking device 100 is outdoor. The Vrect is decided by using various history values obtained from the solar charging module 217 of the location tracking device 100. If the Indoor/Outdoor situation is determined based on the reference value Vrect, the location tracking module suitable for Indoor/Outdoor may be quickly selected, thereby reducing power consumption for searching the location tracking module of the location tracking device.

Based on the decided Vrect value, it is determined whether the solar charging module 217 of the location tracking device is in a charging/non-charging situation (S31).

If the solar charging module 217 of the location tracking device 100 is in a charging situation, it may be determined that the location of the location tracking device is outdoor (S32).

If the location of the location tracking device 100 is outdoor, the location tracking data is acquired using only the GPS module (S33).

However, if the solar charging module 217 of the location tracking device 100 is in a non-charging situation, it may be determined that the location of the location tracking device 100 is indoor (S35).

At this time, location tracking data is acquired by one of the BLE, the WIFI, and the UWB module other than the GPS module (S36).

The acquired location tracking data is transmitted to the network using the low-power communication method (S34).

The low-power communication method may be Sigfox, LoRa, or NB-IoT, and referred to as a low-power communication method of one-way broadcasting that does not transmit a response message for a received signal.

FIG. 11 is a flowchart showing a method for determining the location of the location tracking device 100 of FIG. 10 to be Outdoor and obtaining location tracking data using a GPS module.

Referring to FIG. 11, the step of determining that the location of the location tracking device 100 is outdoor may include the step of determining whether the location tracking data using the GPS module is detected stably (S44).

If the location tracking data is not stably detected, it may be determined that the location of the location tracking device 100 is indoor (S45).

At this time, location tracking data is acquired using one of the BLE, the WiFi, and the UWB module other than the GPS module (S46).

FIG. 12 is a flowchart of method for determining location of the location tracking device of FIG. 1 to be indoor and acquiring location tracking data using any one of the BLE, the WIFI, and the UWB module.

Referring to FIG. 12, if the location of the location tracking device 100 is indoor, the location tracking data is acquired using any one of the BLE, the WIFI, and the UWB modules other than the GPS module (S50~S54).

Here, it is determined whether the location tracking data is stably acquired by the used location tracking module (S55).

If the location tracking data is not stably detected using the previously used location tracking module, the location tracking module is changed with the remaining other location tracking module (S56~S65). The location tracking data may be acquired using the determined location tracking module (S64).

FIG. 12 exemplarily shows a process of searching which of the location tracking module among the BLE, the WIFI, and the UWB may be used.

If the location tracking data may not be detected stably using the BLE, the WIFI, or the UWB module, it may be determined to be the outdoor and the location tracking data may be acquired using the GPS (S52).

As described above, the present disclosure to provide a location tracking device for geo-fence service, which has the solar charging module and the energy harvest module for self-power generation and applies a low-power communication method and location tracking modules. In addition, present invention to provide a location tracking method for providing the low-power consuming geo-fence service by selecting the location tracking module based on the indoor/outdoor information decided by operation of the solar charging module.

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

LEGEND

1: LOCATION TRACKING MODULE 10: WIFI
11: UWB 12: LPWAN
13: BATTERY 14: POWER/CHARGER
15: BLE/MCU 16: GPS
17: SOLAR 18: ACCELELOMETER

The invention claimed is:

1. A device of location tracking for providing low power consuming geo-fence service, comprising:
   a body member;
   a first bend member and a second bend member;
   a flexible battery having a predetermined length, inserted into a receiving portion of the first and second band members, and disposed so that the remaining length except for the portion inserted in the receiving portion is located inside the body member;
   a solar charging module for producing self-power; and
   a circuit board including at least one of a Wireless Fidelity (WIFI), a Bluetooth Low Energy (BLE), a Global Positioning System (GPS), a real-time communication, a Ultra Wide Band (UWB), a Low Power Wide Area Network (LPWAN) communication module for obtaining a location tracking data and communication with network and a control unit (MCU) for controlling the location tracking device;
   wherein the control unit changes the communication module to minimize power consumption of the flexible battery according to a detected operation of solar charging module,
   wherein the control unit determines that the location of the location tracking device is outdoor and the location tracking data is obtained using the GPS module when the solar charging module is a charging operation, and
   wherein the control unit determines that the location of the location tracking device is indoor and the location tracking data is obtained by one of the BLE, the WIFI, and the UWB module other than the GPS module when the solar charging module is a non-charging operation.

2. The device of claim 1, wherein control unit determines the communication module as the Low-Power Wide-Area Network (LPWAN) module when a normal situation is detected,
   wherein the control unit determines the communication module as the Ultra Wide Band (UWB) module when an emergency situation is detected.

3. The device of claim 1, wherein the LPWAN communication module transmits the locating tracking data through one of a Sigfox, a Long Range (LoRa), and a Narrow Band-Internet of Things (NB-IoT) communication network using a broadcasting communication method,
   wherein the real-time communication module transmits the locating tracking data through a Long-term evolution (LTE) Category (Cat.) M1 mobile communication network using a bidirectional communication method.

4. A method of location tracking for providing low power consuming geo-fence service in a location tracking device, comprising:
   detecting a Voltage drop of the rectifiers (Vrect) value which is a reference value for determining a charging or a non-charging operation of the solar charging module;
   determining whether the solar charging module is charging operation or non-charging operation based on the detected the Vrect value;
   determining that a location of the location tracking device is outdoor and a location tracking data is obtained using a Global Positioning System (GPS) module when the solar charging module is in the charging operation;
   determining that a location of the location tracking device is indoor and a location tracking data is obtained using one of a Bluetooth Low Energy (BLE), a Wireless Fidelity (WIFI) Sniffing, and an Ultra-Wide Band (UWB) modules other than the GPS module when the solar charging module is in the non-charging operation; and
   transmitting the location tracking data through a Low Power Wide Area Network (LPWAN) communication module,
   wherein the location tracking data is obtained using the GPS module further comprising:
   determining whether the location tracking data obtained using the GPS module is stably obtained, and if the location tracking data is not stably obtained using the GPS module, and determining the location of the location tracking device is indoor and obtaining the location tracking data using one of the BLE, the WIFI, and the UWB module, and
   wherein the location tracking data is obtained using one of the BLE, the WIFI, and the UWB module other than the GPS module, further comprising: determining whether location tracking data is stably obtained using the location tracking module used before determining the location of the location tracking device is indoor according to the solar charging module,
   searching other location tracking module which is most stably obtainable the location tracking data when the location tracking data is not stably obtained using the used location tracking module, and
   obtaining the location tracking data by the searched location tracking module.

5. The method of claim 4, wherein the LPWAN communication module transmits the locating tracking data through one of a Sigfox, a Long Range (LoRa), and a Narrow Band-Internet of Things (NB-IoT) communication network using a broadcasting communication method.

6. The method of claim 4, the location tracking device includes status definitions that a Standby Status referring a standby state after the initialization of the location tracking device, a Sensor Sensing Status referring a state that measures a heart rate, a body temperature, and an acceleration, an Emergency Status referring a state of processing when the defined emergency situation is occurred, a Status Analysis referring a state of analyzing and managing information from each status, an Indoors/Outdoors detection referring a state of analyzing whether the location of the location tracking device is indoor or outdoor, an Indoor Status referring a state of processing and managing when the location of the location tracking device is indoor, an Outdoor Status referring a state of processing and managing when the location of the location tracking device is outdoor, an Indoor Interference Status referring a state of checking and observing the change of location data indoor, an Outdoor Interference Status referring a state of checking and observing the change of location data in the outdoor, a Geo-Fencing Control Status referring a state of processing when the user deviates from the geo-fence.

7. The method of claim 4, wherein the Vrect value is the reference value determining that the location tracking device is indoor and the reference value determining that the location tracking device is outdoor.

* * * * *